United States Patent [19]

Kamejima et al.

[11] 4,292,811
[45] Oct. 6, 1981

[54] OPERATING METHOD FOR REFRIGERATING MACHINE

[75] Inventors: Kohji Kamejima; Hideki Tanaka; Minoru Kano; Toshihiko Fukushima, all of Shimoinayoshi, Japan

[73] Assignee: Hitachi, Ltd., Tokyo, Japan

[21] Appl. No.: 57,651

[22] Filed: Jul. 16, 1979

[30] Foreign Application Priority Data

Jul. 14, 1978 [JP] Japan .................................. 53-85115

[51] Int. Cl.$^3$ .......................... F24D 11/00; F25D 3/00
[52] U.S. Cl. .......................................... 62/56; 62/59; 165/18
[58] Field of Search ............... 62/59, 157, 56; 165/18, 165/1

[56] References Cited

U.S. PATENT DOCUMENTS 4,039,773  8/1977  Iversen ................................. 219/364

FOREIGN PATENT DOCUMENTS 47-46501  1/1973  Japan .

Primary Examiner—William E. Wayner
Attorney, Agent, or Firm—Craig and Antonelli

[57] ABSTRACT

In an operating method for refrigerating machines which is disclosed, a variation pattern of an air-conditioning load on a prearranged day for refrigerating operation and a variation pattern of ambient temperature on the prearranged day are predicted. A period for refrigerating operation on that day is properly divided into plural time intervals. Priority ranking is allotted to those time intervals on the basis of the ambient temperature predicted. The refrigerating machine is operated in accordance with an operating pattern set on the basis of the priority ranking.

7 Claims, 14 Drawing Figures

OPERATING METHOD FOR REFRIGERATING MACHINE

BACKGROUND OF THE INVENTION

1. Field of the Invention

The present invention relates to an operating method for a refrigerating system and an air-conditioning system which are applicable for buildings and warehouses with refrigeration.

2. Description of the Prior Art

Generally, a refrigerating system and an air-conditioning system employ a refrigerating machine having a smaller capacity than the capacity corresponding to the maximum value of the load of the system for the purpose of reducing instollation and maintenance cost for the system. The refrigerating machine is operated in an operating method as shown in FIGS. 1 to 3. FIG. 1 shows a variation of the load of the system during the period from the start of air-conditioning operation to the end FIGS. 2 and 3 illustrate a variation of an amount of accumulated quantity of heat and a variation of the refrigerating machine's output during the operation of the refrigerating machine. As seen from the graph in FIG. 1, the load $Q_L$ takes place during the period between an air-conditioning start time T1 and the end time T2. And the maximum value of the load far exceeds the maximum value $Q_{R\,Max}$ of the refrigerating machine's output $Q_R$. Therefore, if the refrigerating machine is started at the time T1, the air-conditioning energy is insufficient by the amount corresponding to the sum of the integrating values $S1+S3-S2$. In order to avoid this difficulty, the air-conditioning start time is set at time T1' which is earlier than the time T1, and the air-conditioning energy is accumulated in a heat storage tank by a predictive amount of the energy, as shown in FIGS. 2 and 3. In this case, if a refrigerating machine the maximum output $Q_{R\,Max}$ of which is used, the installation costs for the system may be saved but a large heat storage tank is required. Inversely, if a refrigerating machine having a large capacity is used, the heat storage tank is small but the system cost is expensive. It is a common practice, therefore, that the value of $Q_{R\,Max}$ is suitably selected as a compromise between the system cost and the capacity of the heat storage tank. In the operating method shown in FIGS. 1 to 3, the refrigerating machine must always be operated within the time period that the air-conditioning load takes place. Therefore, the refrigerating machine is operated at the maximum output thereof when the air-conditioning load is largest. In the cooling mode of the air-conditioning system, a time period that the air-conditioning load is high is coincident with one that an ambient temperature is high. For this, the refrigerating machine must be operated at the time that the temperature of cooling water of the refrigerating machine is high, that is, must be operated with a low coefficient of performance of the refrigerating machine. Thus, the conventional operating method of the refrigerating machine is disadvantageous in that the operating cost of the air-conditioning system increases.

A Japanese patent publication No. 46501/'72 discloses another type of refrigerating system in which the refrigerating machine is operated at night to accumulate a predetermined amount of heat and, at the same time, an amount of heat to be used on that day is predicted. When the predictive heat amount is larger than the accumulated heat amount, the refrigerating machine is operated by using surplus power in the day time to compensate for the insufficient amount of the heat.

SUMMARY OF THE INVENTION

An object of the invention is to provide a refrigerating system and an air-conditioning system which are operable at a low operating cost and free from the above-mentioned disadvantages of the conventional systems.

To achieve the above-mentioned object, in the present invention, the operating time period of a refrigerating machine is divided into a proper number of time intervals. Priority ranking is allotted or assigned to those respective intervals on the basis of a predictive variation pattern of ambient temperature. In accordance with the priority ranking, an output variation pattern of the refrigerating machine is determined is order that an integrating value of the refrigerating machine's output is equal to that of the air-conditioning load. The output variation pattern thus determined is used to control the operation of the refrigerating machine. With such a method, the operation cost of the refrigerating machine is minimized.

Other objects and features of the invention will be apparent from the following description taken in connection with the accompanying drawings, in which:

BRIEF DESCRIPTION OF THE DRAWINGS

FIGS. 1 to 3 show graphs for explaining conventional operating methods of a refrigerating system and air-conditioning system, in which FIG. 1 shows a load variation during the period from the air-conditioning start to the air-conditioning end, FIG. 2 shows a variation of accumulated quantity of heat during the operating period of the refrigerating machine, and FIG. 3 shows a refrigerating machine's output variation when the refrigerating machine is operated.

FIGS. 4 to 10 illustrate an embodiment of an operating method for a refrigerating system and air-conditioning system according to the invention, in which FIG. 4 shows a predictive load variation pattern from the air-conditioning start to the air-conditioning end on a prearranged day for a refrigerating operation, FIG. 5 shows a predictive pattern of an ambient temperature variation within the operating period of a refrigerating machine on a prearranged date for the refrigerating operation, FIG. 6 shows priority ranking allotted to the divided plural time intervals of an operating period of a refrigerating machine, FIG. 7 shows a variation pattern of the output of a refrigerating machine within an operating period of the refrigerating machine, FIG. 9 shows integrated curves when the air-conditioning load shown in FIG. 4 and the output of the refrigerating machine shown in FIG. 7 are respectively integrated from the end of the air-conditioning to the start of the air-conditioning in an opposite direction of the time evolution, and FIG. 10 shows a flow chart useful for explaining the operating method of a refrigerating machine according to the invention.

DESCRIPTION OF THE PREFERRED EMBODIMENTS

Figure 4:
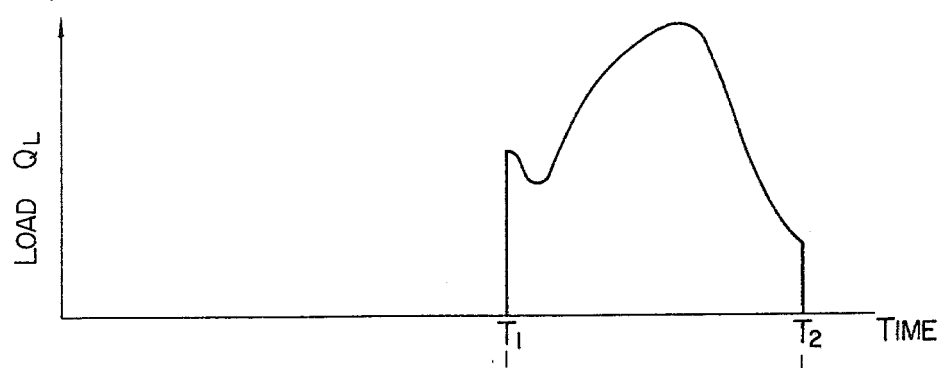
Figure 5:
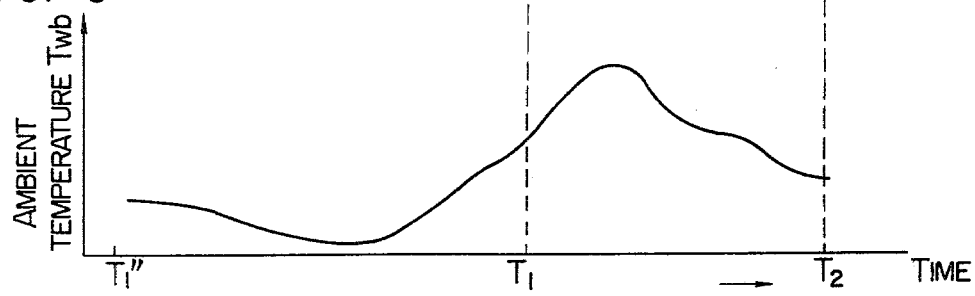
Figure 6:
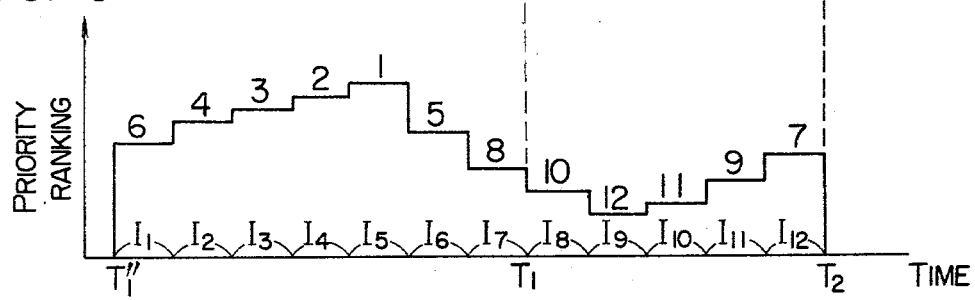
Figure 7:
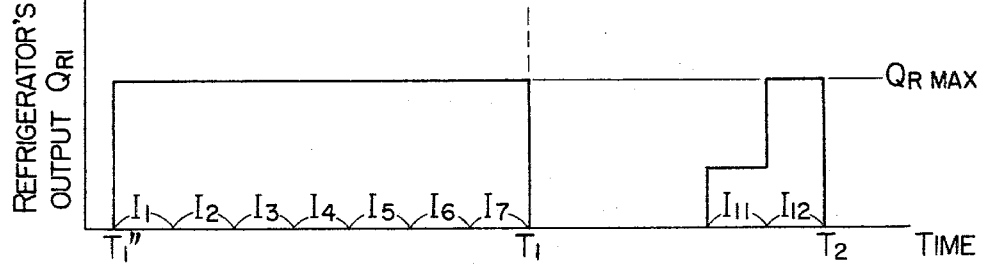
Figure 8A:
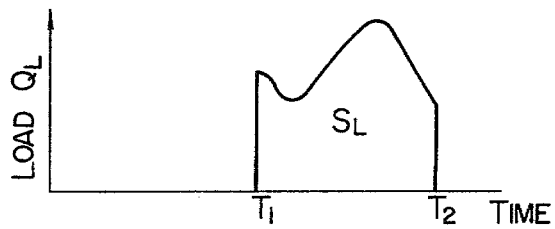
FIGS. 8A to 8E illustrate how to determine a variation pattern of the output of the refrigerating machine shown in FIG. 7 on the basis of the priority ranking shown in FIG. 6.
Figure 8B:
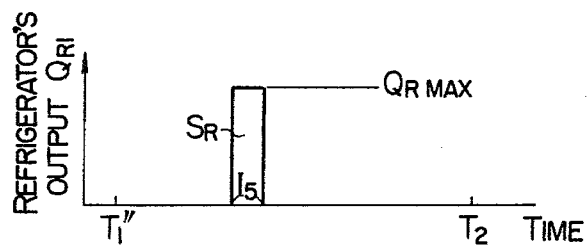
Figure 8C:
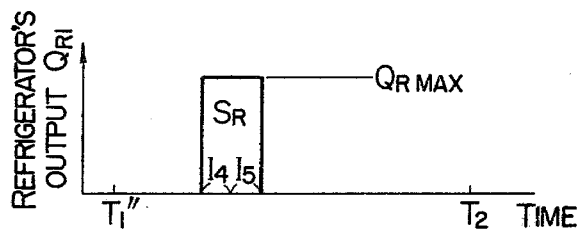
Figure 8D:
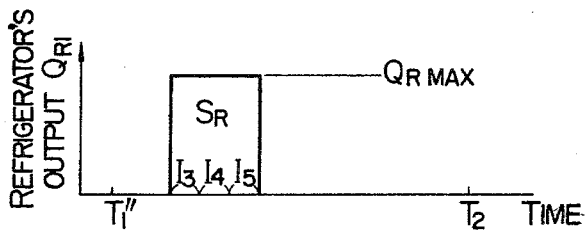
Figure 8E:
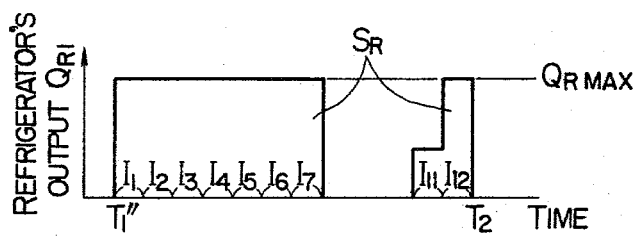

An operating method of a refrigerating machine according to the present invention will be described with reference to FIGS. 4 through 10. Firstly, a start time T1 of air-conditioning, an end time T2 of air-conditioning and a time T1″ for initializing the operation of the refrigerating machine, on a prearranged day for operating the refrigerating machine are set up. A variation pattern of the air-conditioning load $Q_L$ during the period from T1 to T2 is predictively set by using an air-conditioning load predictor, as shown in FIG. 4. Then, a variation pattern of ambient temperature during the period from times T1″ to T2 is predictively set by using an ambient temperature predictor, as shown in FIG. 5. Following this, the time period between T1″ and T2 is divided into a proper number of time intervals. And priority ranking is allotted or assigned to the respective time intervals divided on the basis of the variation pattern of the ambient temperature Twb, as shown in FIG. 6, the Y-coordinate axis indicates the priority ranking. In the present embodiment, the time period from T1″ to T2 is divided into 12 time intervals (for example, if the time interval from T1″ to T2 is 24 hours, each divided interval is 2 hours), the priority ranking is allotted to the divided segments in the order from a low ambient temperature to a high one. Alternatively, the allotment of the priority ranking may be made on depending on a coefficient of performance (i.e. efficiency) of the refrigerating machine which is calculated by using the ambient temperature Twb and the temperature of the water at the outlet of the refrigerating machine. As a third step of the methodological procedure, a variation pattern of the output $Q_{R1}$ of the refrigerating machine is determined. In the embodiment, the refrigerating machine output $Q_R$ is produced, within the maximum output $Q_{R\,Max}$, until an integrating value of the refrigerating machine output $Q_R$ becomes coincident with that of the load $Q_l$. This output production of $Q_R$ is performed by the integration starting from the time interval with a high priority ranking to that of a low priority ranking. How to determine the variation pattern of the refrigerating machine output $Q_{R1}$ in the embodiment will be described with reference to FIG. 8. At the first step, an integrated load $S_L$ is calculated by using the variation pattern of the air-conditioning load $Q_L$, as shown in FIG. 8A. At the second step, the refrigerating system is so set that the refrigerating machine is operated at the maximum output during the interval with the highest priority ranking (the interval $I_5$ in FIG. 6), as shown in FIG. 8B. At this time, the integrated output $S_R$ is given by $S_R = Q_{R\,Max} \times I_5$. Under this condition, however, since $S_R < S_L$ in area, the refrigerating machine must be operated at the maximum output additionally during the segment with the first and second high priority ranking ($I_5 + I_4$ in FIG. 6), as shown in FIG. 8C. As a result, the integrated output $S_R$ is given by $S_R = Q_{R\,Max} \times I_5 + Q_{R\,Max} \times I_4$. At this time, the area $S_R$ is still less than the area $S_L$, i.e. $S_R < S_L$. Therefore, at the third step, the maximum output operation of the refrigerating machine is still continued to the third priority ranking segment ($I_3$ shown in FIG. 6), as shown in FIG. 8D. As a result of this step, the integrated output $S_R$ is $Q_{R\,Max} \times I_5 + Q_{R\,Max} \times I_4 + Q_{R\,Max} \times I_3$. The output $S_R$ is still less than $S_L$. Accordingly, the maximum output operation of the refrigerating machine is further continued to the segments of the fourth and fifth and the succeeding priority ranking. With progression of the refrigerating machine operation, the refrigerating machine operates for the eighth priority ranking segment, in the maximum operation mode. At this stage, the integrated output $S_R$ is given by $$S_R = Q_{R\,Max} \times I_5 + Q_{R\,Max} \times I_4 + Q_{R\,Max} \times I_3 + Q_{R\,Max} \times I_2 + Q_{R\,Max} \times I_6 + Q_{R\,Max} \times I_1 + Q_{R\,Max} \times I_{12} + Q_{R\,Max} \times I_7$$

Figure 1:
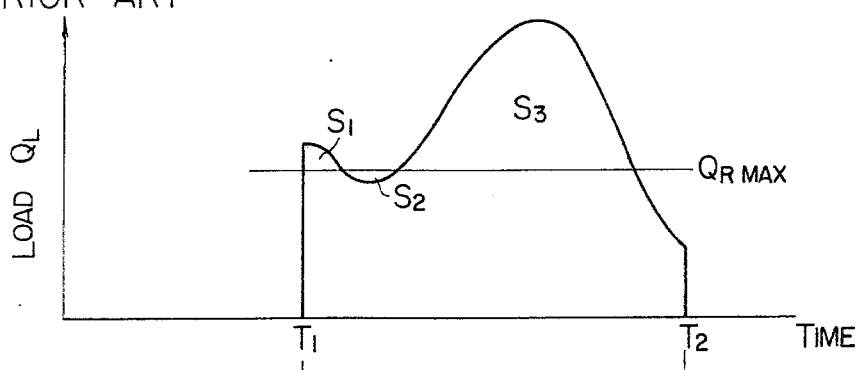
Figure 2:
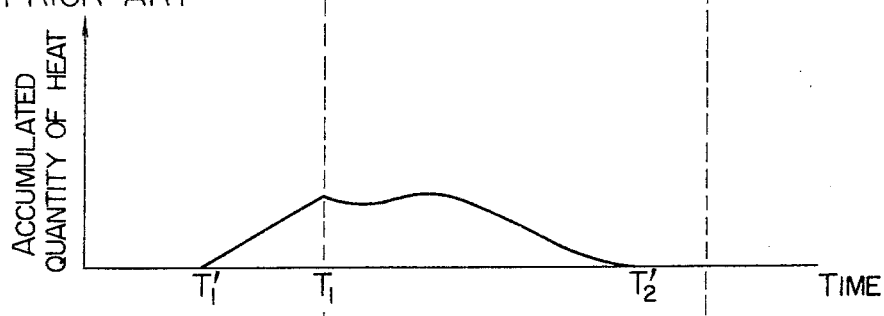
Figure 3:
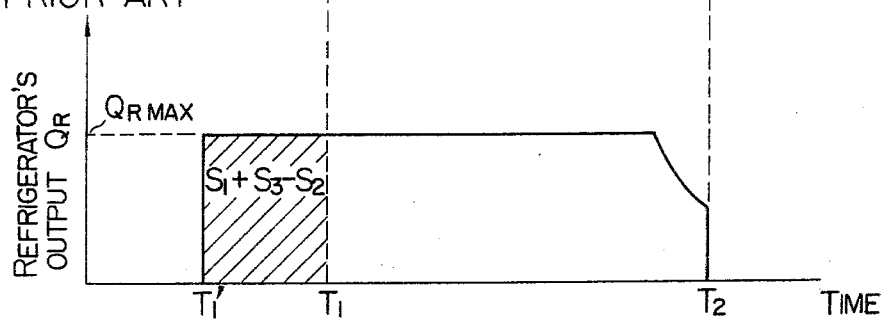
Figure 9:
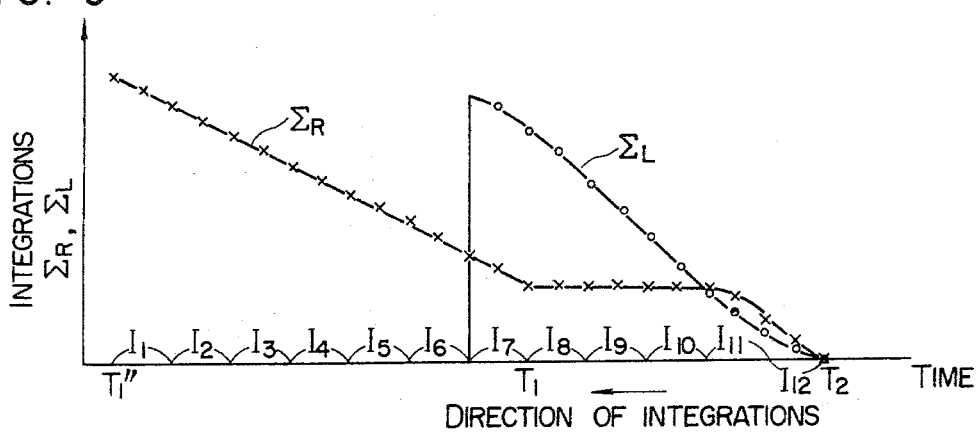

At this stage, $S_R = S_L$ is not yet attained and therefore the insufficient amount of $S_L - S_R$ is allotted to the time interval with the ninth priority ranking ($I_{11}$ of FIG. 6). In other words, for the time interval having the ninth priority ranking, the refrigerating machine operates at the output $Q_R' = (S_L - S_R)/I_{11}$ but at the maximum output. At the fourth step, a variation of the load $Q_L$ shown in FIG. 4 and a variation of the output $Q_{R1}$ shown in FIG. 7 are respectively integrated from time T2 to time T1″ in the inverse direction of time evolution, as shown in FIG. 9. Then, the results $\Sigma R$ and $\Sigma L$ of the integrations are compared with each other. Here, in the period from time T1 to time T2, the relationship of $\Sigma R \leq \Sigma L$ indicates that the refrigerating machine output $Q_{R1}$ is produced prior to the air-conditioning load $Q_L$. The relationship of $\Sigma L < \Sigma R$ indicates the air-conditioning load $Q_L$ is produced prior to the refrigerating machine output $Q_{R1}$. In other words, this indicates that insufficiency of the accumulated quantity of heat temporarily takes place in the system. The consistency in time for the air-conditioning load $Q_L$ and the refrigerating machine output $Q_{R1}$ may thus be judged by calculating those values $\Sigma L$ and $\Sigma R$. If the relationship of $\Sigma R \leq \Sigma L$ always holds between T1 and T2, the $Q_{R1}$ is directly used as the variation pattern of the refrigerating machine output. When $\Sigma L \leq \Sigma R$, the refrigerating machine output $Q_{R1}$ is modified in the following manner obtaining a modified refrigerating machine output $Q_{R2}$. Firstly, the integrated values $\Sigma L$ and $\Sigma R$ during the final time interval $I_{12}$ are compared. If $\Sigma R \leq \Sigma L$, the output $Q_{R1}$ of the refrigerating machine directly used as the modified refrigerating machine output. If $\Sigma L \leq \Sigma R$, the $Q_{R1}$ during the final time segment $I_{12}$ is descreased until the relation of $\Sigma R \leq \Sigma L$ is obtained, thereby to obtain the modified output $Q_{R2}$ and then a difference between $Q_{R1}$ and $Q_{R2}$, i.e. $Q_{R1} - Q_{R2}$, is allotted to the time interval having a higher priority ranking, within the $Q_{R\,Max}$. A similar operating method is made for the time segments of $I_{11}$ and $I_{10}$. A variation pattern thus formed of the modified refrigerating machine output $Q_{R2}$ provides a refrigerating machine operating schedule which permits the refrigerating machine to operate at the lowest operating cost against the air-conditioning load occurring between time T1 and time T2.

Figure 10:
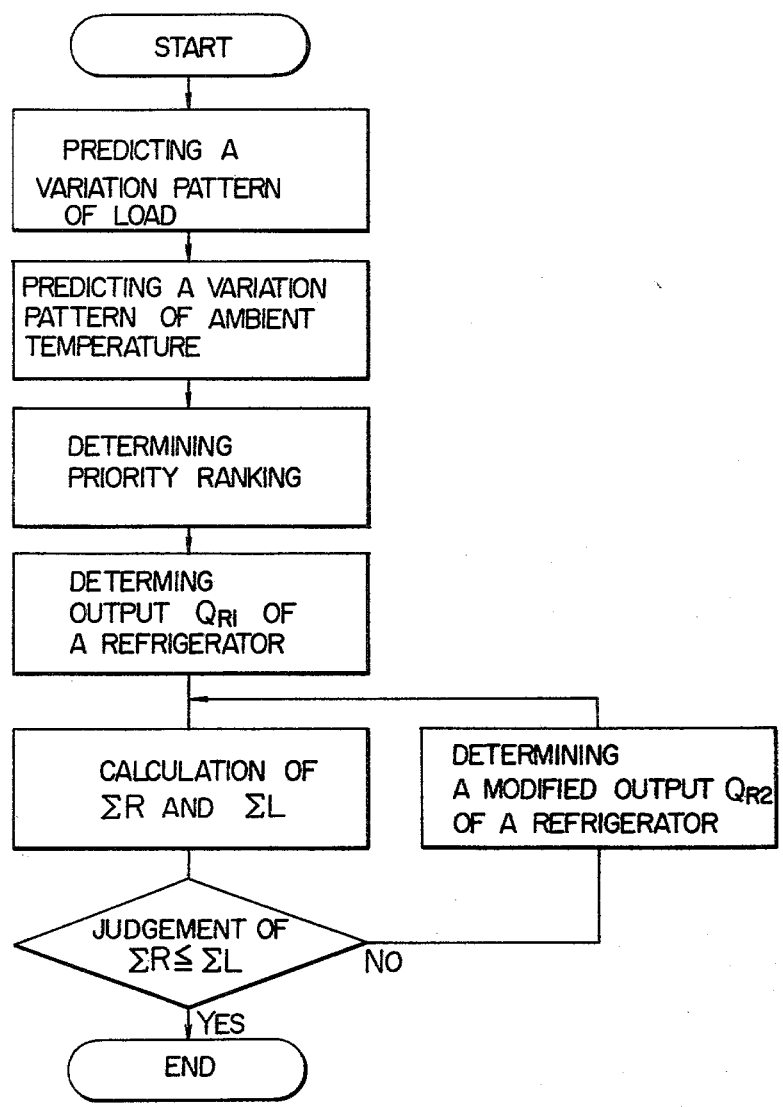

FIG. 10 shows a flow chart illustrating how the operating method for refrigerating machines according to the invention is executed.

As described above, according to the operating method of refrigerating machines of the invention, the operating time period of the refrigerating machine is so selected as to provide the lowest operating cost. Therefore, the refrigerating system and air-conditioning system may be operated at a low maintenance cost.

We claim:

1. An operating method for refrigerating machines having a load predictor for predicting a load on a prearranged day for refrigerating operation, an ambient temperature predictor for predicting a variation of the ambient temperature on the prearranged day, and heat accumulating means for accumulating the output of the refrigerating machine, comprising the steps of operating the refrigerating machine during a predetermined air-conditioning period by:

(1) operating said load predictor at a point in time prior to said predetermined air-conditioning period for producing a load variation pattern indicative of the load that would be experienced by said refrigerating machine during said air-conditioning period;

(2) operating said ambient temperature predictor at a point in time prior to said predetermined air-conditioning period for producing an ambient temperature variation pattern indicative of the ambient temperatures that would be experienced during said air-conditioning period;

(3) dividing said ambient temperature variation pattern into a plurality of time intervals and assigning a priority ranking to each interval as a function of a temperature value of said temperature variation pattern produced for each interval;

(4) determining the output capacity of said refrigerating machine;

(5) determining the number of said time intervals, in order of priority ranking, and the refrigerating output capacity producible therein for the output of said refrigerating machine to at least equal an integrated value of said load variation pattern and producing a refrigerating machine operating schedule in accordance therewith; and (6) controlling the operation of said refrigerating machine during said predetermined period in accordance with said operating schedule.

2. A method according to claim 1, wherein said priority rankings are assigned in a manner providing lowest operating costs.

3. A method according to claim 1, wherein said predetermined period is a day.

4. A method according to claim 1 or 3, wherein said priority rankings are assigned in order from low to high ambient temperatures.

5. A method according to claim 1 or 3, wherein said priority rankings are assigned in order on the basis of a coefficient of performance.

6. A method according to claim 5, wherein said coefficient of performance is determined as a function of ambient temperature and the temperature of water at an outlet of said refrigerating machine.

7. A method according to claim 1, wherein said step of producing an operating schedule includes the step of comparing an integrated value of refrigerating output producible during the determined number of intervals with said integrated value of said load pattern, and when said integrated output value exceeds said integrated load value, reducing the amount of scheduled refrigerating output, in the lowest priority interval during which an integrated value of refrigerating output producible therein is greater than an integrated value of a portion of said load pattern corresponding to said interval, to a value equalizing the integrated output value for the determined number of intervals with that of the integrated load value of said load pattern.

* * * * *